(12) United States Patent
Tan et al.

(10) Patent No.: US 10,917,140 B2
(45) Date of Patent: Feb. 9, 2021

(54) DYNAMIC SIGNALING OF COHERENCE LEVELS

(71) Applicant: Nokia Technologies Oy, Espoo (FI)

(72) Inventors: Jun Tan, Lake Zurich, IL (US); Dan Park, Yongin-si (KR); Bill Hillery, Lafayette, IN (US)

(73) Assignee: Nokia Technologies Oy, Espoo (FI)

( * ) Notice: Subject to any disclaimer, the term of this patent is extended or adjusted under 35 U.S.C. 154(b) by 92 days.

(21) Appl. No.: 16/150,801

(22) Filed: Oct. 3, 2018

(65) Prior Publication Data
US 2020/0112346 A1 Apr. 9, 2020

(51) Int. Cl.
H04B 7/024 (2017.01)
H04B 7/06 (2006.01)
H04L 5/00 (2006.01)
H04W 8/24 (2009.01)
H04B 7/0413 (2017.01)

(52) U.S. Cl.
CPC ........... *H04B 7/024* (2013.01); *H04B 7/0626* (2013.01); *H04L 5/0048* (2013.01); *H04W 8/24* (2013.01); *H04B 7/0413* (2013.01)

(58) Field of Classification Search
CPC .... H04B 7/024; H04B 7/0626; H04B 7/0413; H04L 5/0048; H04W 8/24
See application file for complete search history.

(56) References Cited

U.S. PATENT DOCUMENTS

| 2015/0282126 | A1* | 10/2015 | Park | H04L 5/0091 |
| | | | | 370/329 |
| 2015/0349855 | A1* | 12/2015 | Sesia | H04B 7/024 |
| | | | | 370/252 |
| 2018/0167117 | A1* | 6/2018 | Liu | H04B 7/063 |
| 2018/0227094 | A1* | 8/2018 | Liu | H04L 5/0094 |
| 2018/0331727 | A1* | 11/2018 | John Wilson | H04B 7/0408 |
| 2019/0081671 | A1* | 3/2019 | Yang | H04B 7/0404 |
| 2019/0199496 | A1* | 6/2019 | Qin | H04B 7/0404 |
| 2019/0393931 | A1* | 12/2019 | Huang | H04B 7/0456 |
| 2020/0067608 | A1* | 2/2020 | Shim | H04B 17/12 |

OTHER PUBLICATIONS

Nokia Corporation, Measurement results of relative phase difference, R4-121122, 3GPP TSG-RAN WG4 Meeting #62bis, Jeju Island, Korea, Mar. 26-30, 2012 (3 Pages).

(Continued)

*Primary Examiner* — Rina C Pancholi
(74) *Attorney, Agent, or Firm* — Harrington & Smith (57) ABSTRACT

According to an example embodiment, a method is provided including: receiving, at a user equipment from a network node, a coherence group configuration, wherein the group coherence group configuration indicates at least: one or more transmit groups, wherein each transmit group includes one or more transmit ports of the user equipment, and wherein the one or more transmit ports in each group are coherent; and one or more receive groups, wherein each receive group includes one or more receive ports of the user equipment, and wherein the one or more receive ports in each group are coherent; determining a change in the coherence group configuration; and transmitting information indicating the change to the network node.

20 Claims, 6 Drawing Sheets

---

600: receiving, at a user equipment from a network node, a coherence group configuration, wherein the group coherence group configuration indicates at least:
- one or more transmit groups, wherein each transmit group comprises one or more transmit ports of the user equipment, and wherein the one or more transmit ports in each group are coherent; and
- one or more receive groups, wherein each receive group comprises one or more receive ports of the user equipment, and wherein the one or more receive ports in each group are coherent 602: determining a change in the coherence group configuration 604: transmitting information indicating the change to the network node (56) References Cited

OTHER PUBLICATIONS

Zte "UL Beam Management for NR MIMO" 3GPP Draft; R1-1712299 UL Beam Management for NR Mimo, $3^{rd}$ Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017 (Aug. 20, 2017); XP051315115, retrieved from the internet: URL: http://www.3gpp.org/ftp/Meetings_3GPP_SYNC/RAN1/Docs [retrieved on Aug. 20, 2017] pp. 1-4.

Interdigital Inc: "UE Coherency for Non-CB Bases UL Transmission", 3GPP Draft; R1-1802617 UE Coherency for Non-CB Based UL Transmission. $3^{rd}$ Generation Partnership Project (3GPP), Mobile Competence Centre; 650, Route Des Lucioles; F-06921 Sophia Antipolis Cedex, vol. RAN WG1, No. Athens, Greece; Feb. 26, 2018- Mar. 2, 2018 Feb. 17, 2018 (Feb. 17, 2018), XP051398056, retrieved from the internet: URL: http://www.3gpp.org/ftp/tsg%5Fran/WG1%5FRL1/TSGR1%5F92/Docs/ [ retrieved on Feb. 17, 2018] pp. 2-3.

Mediatek Inc: "Codebook Based Transmission for UL" 3GPP Draft; R1-1719562 Codebook Final, $3^{rd}$ Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017 (Nov. 18, 2017), XP051369376, Retrieved from the Internet: URL:http://www.3gpp.org/ftp/tsg%5Fran/WG1%5FRL1/TSGR1%5F91/Docs/ [retrieved on Nov. 18, 2017] pp. 3-5, 16—p. 17.

\* cited by examiner

| PARAMETERS | CANDIDATE VALUES |
|---|---|
| # of Rx co-groups | {1, ..., num_of Rx ports} |
| # of Tx co-groups | {1, ..., num_of Tx ports} |
| Port IDs per Rx co-group | {p_i}_k, for k-th Rx co-group |
| Port IDs per Tx co-group | {p_i}_k, for k-th Tx co-group |
| Rx co-group ID per each Tx co-group | g_i, i=0, ..., num of Tx co-groups-1 |

FIG. 3A

| PARAMETERS | EXAMPLE VALUES |
|---|---|
| # of Rx co-groups | 2 |
| # of Tx co-groups | 2 |
| Port IDs per Rx co-group | (0, 1), (2, 3) |
| Port IDs per Tx co-group | (0), (1) |
| Rx co-group ID per each Tx co-group | (0, 1) |

FIG. 3B

| PARAMETERS | EXAMPLE VALUES |
|---|---|
| # of Rx co-groups | 2 |
| # of Tx co-groups | 2 |
| Port IDs per Rx co-group | (0, 1, 2, 3), (4, 5, 6, 7) |
| Port IDs per Tx co-group | (0, 1), (2, 3) |
| Rx co-group ID per each Tx co-group | (0, 1) |

600: receiving, at a user equipment from a network node, a coherence group configuration, wherein the group coherence group configuration indicates at least:
- one or more transmit groups, wherein each transmit group comprises one or more transmit ports of the user equipment, and wherein the one or more transmit ports in each group are coherent; and
- one or more receive groups, wherein each receive group comprises one or more receive ports of the user equipment, and wherein the one or more receive ports in each group are coherent 602: determining a change in the coherence group configuration 604: transmitting information indicating the change to the network node

FIG. 6

700: maintaining, by a network node, information corresponding to a coherence group configuration of a user equipment, wherein the information comprises at least:
- one or more transmit groups, wherein each transmit group comprises one or more transmit ports of the user equipment, and wherein the one or more transmit ports in each group are coherent, and
- one or more receive groups, wherein each receive group comprises one or more receive ports of the user equipment, and wherein the one or more receive ports in each group are coherent 702: determining, by the network node, a change in the coherence group configuration of the user equipment 704: transmitting an indication of the change in the coherence group configuration to the user equipment

FIG. 7

DYNAMIC SIGNALING OF COHERENCE LEVELS

TECHNICAL FIELD

Various embodiments relate generally to wireless communication systems and, more specifically, relate to channel reciprocity in wireless communication systems.

BACKGROUND

For a TDD (time-division duplexing) system, uplink and downlink transmission occupies the same frequency resources. If uplink (UL) and downlink (DL) waveforms are transmitted within the channel coherence time, the UL channel and the DL channel can be considered identical. This is called channel reciprocity, where the DL channel can be estimated in uplink and vice versa, and can result in savings to downlink and/or uplink overhead for CSI estimation and feedback in TDD systems.

Abbreviations that may be found in the specification and/or the drawing figures are defined below, at the beginning of the detailed description section.

BRIEF SUMMARY

This section is intended to include examples and is not intended to be limiting.

In an example of an embodiment, a method is disclosed that includes receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; determining a change in the coherence group configuration; and transmitting information indicating the change to the network node.

An additional example of an embodiment includes receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; determining a change in the coherence group configuration; and transmitting information indicating the change to the network node.

An example of an apparatus includes one or more processors and one or more memories including computer program code. The one or more memories and the computer program code are configured to, with the one or more processors, cause the apparatus to perform at least the following: receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; determining a change in the coherence group configuration; and transmitting information indicating the change to the network node.

In another example of an embodiment, an apparatus comprises means for receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; means for determining a change in the coherence group configuration; and means for transmitting information indicating the change to the network node.

In an example of an embodiment, a method is disclosed that includes maintaining, by a network node, information corresponding to a coherence group configuration of a user equipment, wherein the information comprises at least: one or more transmit groups, wherein each transmit group comprises one or more transmit ports of the user equipment, and wherein the one or more transmit ports in each group are coherent, and one or more receive groups, wherein each receive group comprises one or more receive ports of the user equipment, and wherein the one or more receive ports in each group are coherent; determining, by the network node, a change in the coherence group configuration of the user equipment; and transmitting an indication of the change in the coherence group configuration to the user equipment.

An additional example of an embodiment includes receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; determining a change in the coherence group configuration; and transmitting information indicating the change to the network node.

An example of an apparatus includes one or more processors and one or more memories including computer program code. The one or more memories and the computer program code are configured to, with the one or more processors, cause the apparatus to perform at least the following: maintaining, by a network node, information corresponding to a coherence group configuration of a user equipment, wherein the information comprises at least: one or more transmit groups, wherein each transmit group comprises one or more transmit ports of the user equipment, and wherein the one or more transmit ports in each group are coherent, and one or more receive groups, wherein each receive group comprises one or more receive ports of the user equipment, and wherein the one or more receive ports in each group are coherent; determining, by the network node, a change in the coherence group configuration of the user equipment; and transmitting an indication of the change in the coherence group configuration to the user equipment.

In another example of an embodiment, an apparatus comprises means for maintaining, by a network node, information corresponding to a coherence group configuration of a user equipment, wherein the information comprises at least: one or more transmit groups, wherein each transmit group comprises one or more transmit ports of the user equipment, and wherein the one or more transmit ports in each group are coherent, and one or more receive groups, wherein each receive group comprises one or more receive ports of the user equipment, and wherein the one or more receive ports in each group are coherent; means for determining, by the network node, a change in the coherence group configuration of the user equipment; and means for transmitting an indication of the change in the coherence group configuration to the user equipment.

DETAILED DESCRIPTION OF THE DRAWINGS

The following abbreviations that may be found in the specification and/or the drawing figures are defined as follows:
3GPP third generation partnership project
5G fifth generation
5GC 5G core network
AMF access and mobility management function
co-group coherence group
CSI channel state information
CU central unit
DL downlink
DU distributed unit
eNB (or eNodeB) evolved Node B (e.g., an LTE base station)
EN-DC E-UTRA-NR dual connectivity
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MIMO multiple input multiple output
MME mobility management entity
MU-MIMO multiple user multiple input multiple output
N/W or NW network
NCE network control element
ng or NG new generation
ng-eNB new generation eNB
NR new radio
PDCP packet data convergence protocol
PHY physical layer
PTRS phase tracking reference symbols
RAN radio access network
Rel release
RLC radio link control
RRC radio resource control
RRH remote radio head
RU radio unit
Rx receiver
SDAP service data adaptation protocol
SGW serving gateway
SMF session management function
SRS sounding reference symbols
TDD time-division duplexing
TRP transmit/receiving point
TS technical specification
Tx transmitter
UE user equipment (e.g., a wireless, typically mobile device)
UL uplink
UPF user plane function The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

In time-division duplexing (TDD) systems, the uplink and downlink transmissions take place over the same frequency resource. Hence, if the transmissions are performed within the channel coherence time, the uplink and downlink channel states are identical. As a result, the downlink channel to each UE ideally can be estimated in the uplink direction through the transmission of SRS from the UEs, and can be used in the design of downlink beams. This can bring about a huge overhead savings by eliminating/reducing the need of CSI feedback. Similarly, downlink reference signals may be used by the UEs to infer uplink channel and used for non-codebook based uplink MIMO transmissions.

However, in practice, each node (e.g. gNBs/TRPs and UEs) introduces a mismatch, i.e., an amplitude and a phase perturbation, to the transmitted/received signals. Hence, although the propagation channels are reciprocal, transceiver RF chains are not necessarily identical across different nodes/antennas, which create differences between the Tx and Rx responses. Moreover, the phase of the channel also includes the effect of the phase of the modulating carrier waveform and transmitter/receiver sampling timing. Hence, the effective downlink and uplink channels between any two given antennas are not ideal reciprocal. If the impact of these transmit/receive imbalances are not accounted for in the design of precoders, MIMO performance may significantly degrade. This is especially important for MU-MIMO and/or coherent joint transmission (such as CoMP-JT) schemes that rely heavily on good spatial separation of layers of co-scheduled UEs. The performance of such MU-MIMO and CoMP-JT is very sensitive to inaccurate channel knowledge. Thus, the inaccurate reciprocity may become the performance bottleneck of reciprocity-based MU-MIMO/CoMP-JT unless proper calibration is performed.

For a UE with multiple transmit-port capability, sufficient transmit phase calibration among multiple Tx ports is needed and maintained to ensure desired codebook based and non-codebook based transmission. For example, without calibrated transmit antenna ports in uplink MIMO operation, uplink MIMO suffers performance loss at least, or may even not work at all.

For uplink MIMO transmission, phase noise and/or jitter causes independent phase variations among its Tx antenna ports. For example, when PA is switching (for uplink power control) in an implementation of multiple-PA stages, this usually causes rapid phase changes which severely degrades uplink precoding performance (e.g. For example, phase shifting may be 25 degrees or higher). This phenomenon is called phase discontinuity. Without constant phase calibration, uplink performance is severely degraded. On the other hand, phase calibration circuit is generally expensive to implement at the UE, and the UE may choose to not implement phase calibration or not to run the calibration circuit full time.

The core objective of calibration is to estimate the mismatches introduced at the transmit/receive chains of different antennas involved in MIMO, and mitigate them when designing beamforming vectors.

Currently, 3GPP Rel-15 NR supports various coherence level (up to 4Tx ports) as UE capabilities to accommodate various UE implementations on Tx port calibrations. A UE indicates its Tx coherence levels through UE capability signaling, and a gNB can configure the UE to operate at its declared coherence levels or below. However, such a design does not address the dynamic nature of phase discontinuity of uplink transmission. Rel-15 NR does not support Tx/Rx calibration.

Also, Rel-15 NR supports a QCL (quasi co-location) concept so that a UE can decode PDSCH according to a detected PDCCH with DCI intended for the UE based on high layer configurable M TCI-States. Each configured TCI state includes one RS set, each of which contains parameters for configuring QCL between the reference signals in the RS set and the DM-RS port group of the PDSCH. The QCL is related the DL transmission for association of DL RS and DM-RS port group, and does not address uplink issues.

Further, Rel-15 NR supports beam correspondence with configurability for DL/UL, depending on UE's capability. When beam correspondence is maintained, an uplink beam, usually an SRS resource, may have an identical channel to a downlink beam, such as a CSI-RS resource for example. For UE with this capability, a gNB can configure the UE with beam correspondence. However, Tx/Rx calibration on the UE is maintained regardless of UE side RPD (relative phase discontinuity) and power perturbance as there is no dynamic signaling on UE's calibration status, Various exemplary embodiments herein describe techniques for dynamic signaling of coherence levels, and, for example, address the calibration issue with specific dynamic signaling on Tx/Rx coherence status. Additional description of these techniques is presented after a system into which the exemplary embodiments may be used is described.

Figure 1:
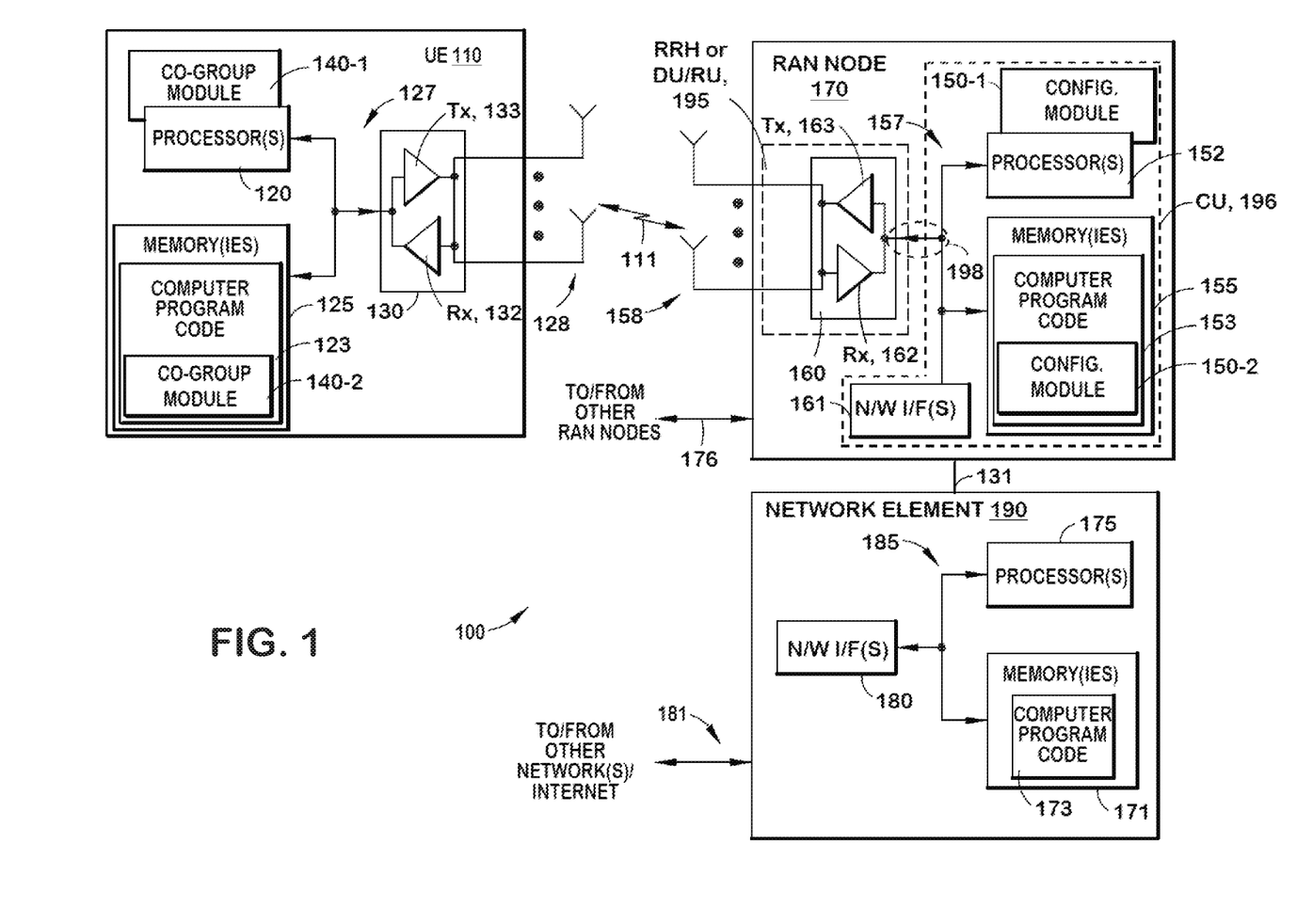
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network control element(s) (NCE(s)) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a co-group module, comprising one of or both parts 140-1 and/or 140-2, which may be implemented in a number of ways. The co-group module may be implemented in hardware as co-group module 140-1, such as being implemented as part of the one or more processors 120. The co-group module 140-1 may be implemented also as an integrated circuit or through other hardware such as a programmable gate array. In another example, the co-group module may be implemented as co-group module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the NE(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a configuration (config.) module, comprising one of or both parts 150-1 and/or 150-2, which may be implemented in a number of ways. The configuration module may be implemented in hardware as configuration module 150-1, such as being implemented as part of the one or more processors 152. The configuration module 150-1 may be implemented also as an integrated circuit or through other hardware such as a programmable gate array. In another example, the configuration module may be implemented as configuration module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the configuration module may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element (NE) (or elements, NE(s)) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NE(s) 190, and note that both 5G and LTE functions might be supported. The RAN node 170 is coupled via a link 131 to the NE 190. The link 131 may be implemented as, e.g., an NG interface for 5G, or an S1 interface for LTE, or other suitable interface for other standards. The NE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Various example embodiments provide a coherence group concept (also referred to as a 'co-group') for Tx and Rx side. All ports in a coherence group are considered coherent. The Tx/Rx coherence group association is designed to indicate Tx/Rx coherence. The associated Tx/Rx coherence groups indicate the Tx/Rx ports are phase calibrated. This co-group concept can easily be applied for UE multi-panel operation. Various example embodiments also allow a UE to perform its Tx port calibration and Tx/Rx port calibration at its best effort. According to some example embodiments, when calibration fails, the UE reports its change of coherence level with information of Tx/Rx co-group and co-group association. In some example embodiments, a gNB measures uplink PTRS and/or SRS to determine UE coherence levels. The gNB may then schedule the UE to operate at a lower coherent level to ensure proper performance.

Tx/Rx Coherence Group and Association

A coherence group, is defined as a group of antenna ports that are coherent. According to some example embodiments, a coherence group can be defined for transmit ports as Tx coherence group, or for receiving ports, as Rx coherence group. In Rel-15 NR specification, for example, coherence levels are used to define Tx coherence. For a UE having four transmit ports (denoted '4Tx'), there are three coherence levels for codebook based uplink transmission, i.e., coherent (which may also be referred to as fully coherent), non-coherent, and partial coherent. In this example, 'coherent' indicates that all ports can be transmitted coherently, 'partial coherence' indicates a port pair can be transmitted coherently, and 'non-coherent' indicates that no port pairs can be transmitted coherently.

According to some example embodiments, coherence levels for 4Tx are mapped to 1 co-group, 4 co-groups, and 2 co-groups, respectively. This concept can also be extended to different numbers of transmit ports. For instance, for 8Tx there are four coherence levels:

1 co-group: full coherence (all 8 Tx ports are coherent)
2 co-groups: 2 coherence groups, where each group has 4 coherent Tx ports
4 co-groups: 4 coherence group, where each group has 2 coherent Tx ports
8 co-groups: all ports are non-coherent The coherence groups may, for example, be applied for Rx ports, where all Rx ports/chains are coherent in one coherence group. For example, the coherence groups can be applied in an antenna panel-based structure, where two antenna panels may or may not calibrate their Rx phases. A UE may have multiple Tx and Rx chains, but the UE may have a different number of coherence groups to indicate whether coherent Tx/Rx is possible and at which subsets of antenna ports.

In some example embodiments, coherence group association between UE's Tx coherence groups and its Rx coherence groups is used to enable Tx/Rx reciprocity at the UE side. For example, if one Tx coherence group is associated to a specific Rx coherence group, this indicates that these Tx/Rx ports in the two coherence groups are phase-calibrated. When there is only one Tx coherence group and one Rx coherence group, the Tx/Rx coherence association indicates Tx/Rx coherent ports; otherwise the Tx and Rx are not phase calibrated.

In examples where there are more than one coherence group, different combinations of Tx/Rx coherence group associations can be defined to address various possible coherent Tx/Rx port combinations. For example, assume a UE has 2Tx and 2Rx with one Rx coherence group and two Tx coherence groups. When a first Tx coherence group (namely, 1 Tx port in this example) is associated with the Rx coherence group, this indicates that the Tx port is phase calibrated with the Rx ports, and the Tx ports in the other coherence group (namely, the one other Tx port, in this example) is phase independent from the Rx ports. Using such group association can simplify the indication of Tx and Rx port calibration.

Figure 2:
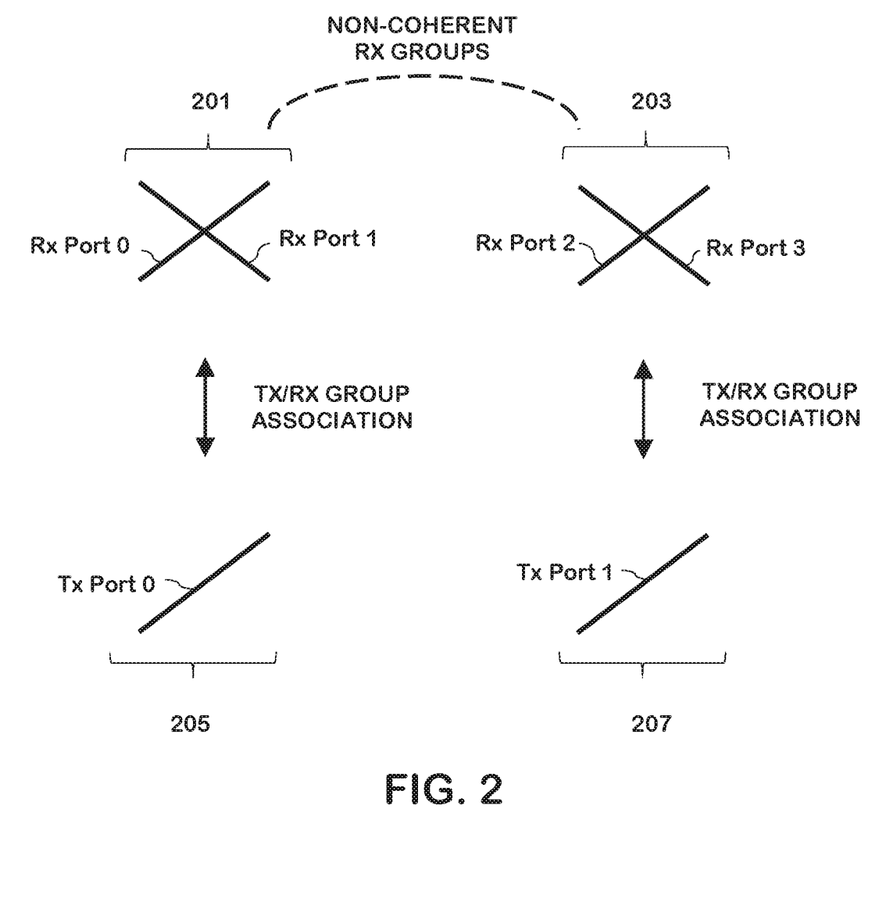
FIG. 2 shows an example Tx/Rx co-group associations in accordance with exemplary embodiments.

Tx and Rx chains are generally not symmetric for UE implementation. For instance, a UE may have a larger number of Rx RF chains than that of its Tx RF chains. FIG. 2 shows a non-limiting example of Tx co-groups and associated Rx co-groups for a user equipment with four Rx ports and two Tx ports. In the example shown in FIG. 2, the two Tx antenna ports are Tx port 1 and Tx port 0 and the four Rx antenna ports are Rx ports 0-3. The two Tx co-groups 205, 207 indicate that Tx port 0 and Tx port 1 are not coherent. The two Rx co-groups 201, 203 indicate that Rx ports 0, 1 are coherent and Rx ports 2, 3 are coherent. In this example, Rx there is a Tx/Rx group association between Rx group 201 and Tx group 205 and between Rx group 203 and Tx group 207. The Tx/Rx association indicates, for example, that Tx port 0 is phase calibrated with Rx ports 0 and 1. This may be applicable to a situation where a UE includes two non-coherent x-pol antenna arrays, where each x-pol array has 1Tx and 2Rx. In this situation, the co-groups shown in FIG. 2 would indicate that the 2Rx in each of the x-pol arrays are phase calibrated together with its corresponding 1Tx port. In general, the Tx/Rx coherence group association may be applied to Tx/Rx antenna panel structure. For example, two panels can be phase calibrated, indicating that these ports belong to one coherence group; or two panels are independent, indicating two co-groups.

Figure 3A:
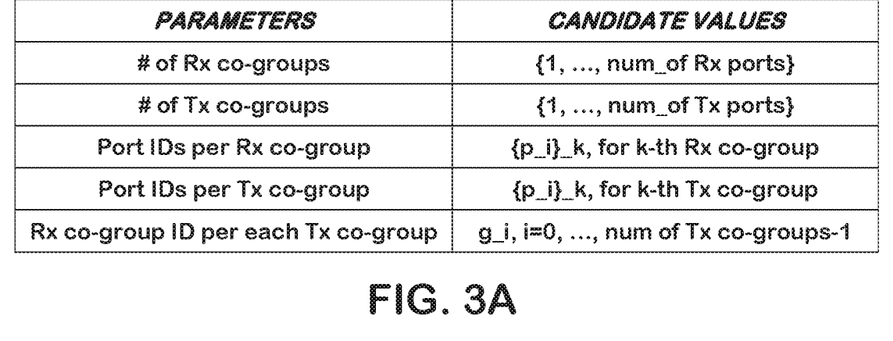
FIGS. 3A-3C are examples tables for co-group in accordance with exemplary embodiments.

FIG. 3A shows a table summarizing Tx/Rx coherence group information according to an example embodiment. In this example, the $1^{st}$ row indicates the number of Rx co-groups. The $2^{nd}$ row is the number of Tx coherence groups. The $3^{rd}$ and $4^{th}$ rows provide the list of port IDs per each corresponding coherence group, for Rx and Tx, respectively. The $5^{th}$ row indicates associations between the Rx and Tx co-groups, namely, as the Rx co-group ID per each Tx coherence group. In some example embodiments, the information in Tx/Rx shown in table 3 may represent a specific 'coherence group configuration'.

Figure 3B:
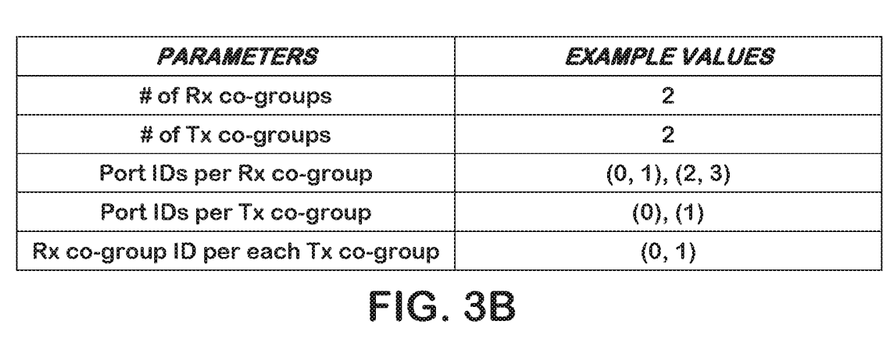

FIG. 3B shows an example where the table includes values corresponding to the example in FIG. 2. For example, the values in the table of FIG. 3B correspond to a specific coherence group configuration. In particular, the $1^{st}$ row indicates there are two Rx co-groups, and the second row indicates there are two Tx co-groups. The value in the $3^{rd}$ row is (0,1), (2,3) which indicates that one of the Rx group includes Rx ports 0 and 1, and the other Rx co-group includes Rx ports 2 and 3. Similarly, the $4^{th}$ row indicates that one Tx co-group includes Tx port 0 and the other Tx co-group includes Tx port 1. This indicates that Rx ports 0 and 1 are coherent, and Rx ports 2 and 3 are coherent and that ports 0 and 1 are not coherent to ports 2 and 3 in Rx chain. On the Tx chain, Tx port 0 and Tx port 1 are non-coherent. The $5^{th}$ row indicates that the $1^{st}$ Tx co-group is associated with the $1^{st}$ Rx co-group, and that the 2nd Tx co-group is associated with the 2nd Rx co-group. As such, the Tx port 0 is calibrated to Rx ports 0 and 1; and Tx port 1 is calibrated to Rx ports 2 and 3.

Figure 3C:
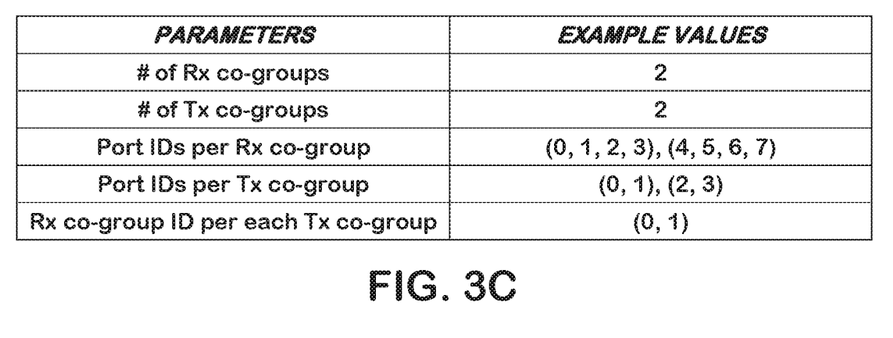

FIG. 3C shows another example of a table having values corresponding to a 4Tx/8Rx scenario. For example, the values in the table of FIG. 3C correspond to another coherence group configuration. In this example, the table indicates there are 2 RX co-groups and 2 TX co-groups, and that the Rx co-group including Rx ports 0, 1, 2, 3 is associated with the Tx co-group including Tx ports 0, 1. The Rx co-group including Rx ports 4, 5, 6, 7 is associated with the Tx co-group including Tx ports 2, 3.

UE-Based Signaling of Coherence Level

As noted above, currently coherence levels for Tx ports are indicated through UE capability signaling, and a gNB can configure the UE to operate at its declared coherence levels or below, however there is no dynamic signaling mechanism for coherence level. Phase discontinuity and amplitude perturbance happens quite often in UE MIMO RF antenna chains. For example, Tx PA stage switching causes large phase discontinuity when uplink power control is applied as mentioned above. Besides, even for a UE with calibration capability, the UE may choose to turn off phase-calibration circuits in order to save power. These factors may severely impact UE coherence among its Tx/Rx ports.

According to some example embodiments, a UE performs its Tx/Rx port calibration at its 'best effort'. For example, the UE attempts to calibrate its Tx ports to maintain the UE's current coherence configuration. When calibration fails, the UE reports its change of coherence level. The report includes the UE's changed Tx/Rx coherence groups, and Tx/Rx coherence group association. In some examples, the report from the UE may be a 'full' report in the sense that it includes all information in, e.g., FIG. 3A. In other examples, the report from the UE may include only the information that is different from the previous coherence configuration, such as via delta values. The gNB may then use the updated coherence group information to schedule the UE with the proper codebook-based and non-codebook based transmission.

Figure 4:
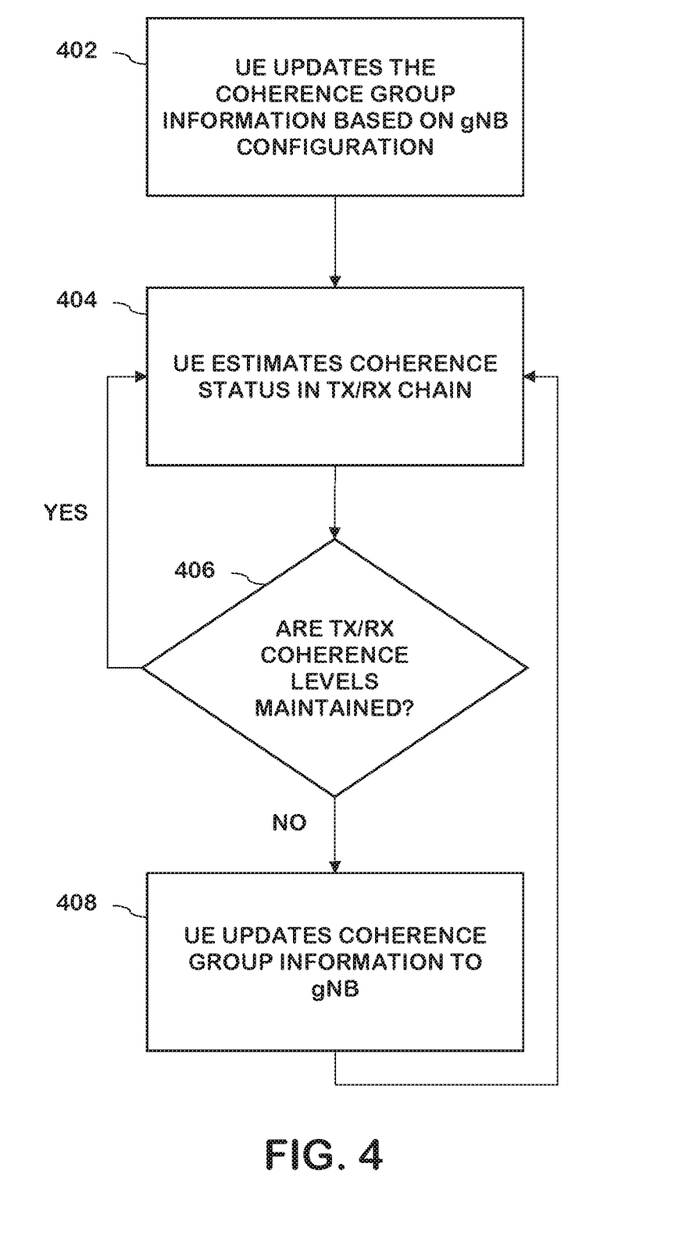
FIG. 4 is a flowchart of UE-based signaling in accordance with an example embodiment.

FIG. 4 illustrates a flowchart of UE-based signaling in accordance with an example embodiment. At 402, a UE (such as UE 110 for example) updates coherence group information based on a configuration received from a gNB. The coherence group information is maintained based on either the UE's capability or high layer configuration. For example, a UE may maintain a table in accordance with FIG. 3A for example. At 404, the UE continuously monitors its Tx/Rx chain coherence level based on its calibration processes, which may involve calibration circuits or algorithms so that the UE can ensure phase alignment in the Tx/Rx RF chains. If the UE detects 406 a change of the Tx/Rx coherence levels, then the UE signals the updated coherence group information to the gNB as shown by block 408. The UE then returns to block 404 and estimates its coherence status in its Tx/Rx chain. As long as no change in the Tx/Rx coherence levels are detected 406, then the UE continues to monitor the Tx/Rx chain coherence levels in its Tx/Rx chains as shown at 404.

According to some example embodiments, the signaling method is based on uplink control channel (PUCCH). The gNB uses the updated coherence group information to adjust the UL-MIMO scheduling for the specific UE. Some non-limiting examples of a gNB's scheduling operations are:
  If the Tx/Rx coherence group association is lost due to large phase shifting in Tx or Rx chains, then the gNB is aware that Tx/Rx reciprocity cannot be made. gNB cannot use SRS to determine its DL CSI, and the UE cannot use CSI-RS to determine its UL CSI. The gNB controls the UE to use DL feedback for DL CSI acquisition, and schedules the UE for SRS transmission for UL CSI acquisition.
  If the gNB determines Tx coherence level is changed from coherent to non-coherent (such as due to a change in the coherence group information for example), the gNB schedules the UE to work with non-coherent codebook, if UE is scheduled with codebook-based transmission.

gNB-Based Coherence Group Detection

According to some example embodiments, a RAN node (such as a gNB for example) may measure uplink PTRS and/or SRS to determine UE Tx-coherence levels. When detected phase shifting among UE's Tx ports is small, related phase compensation can be applied at the receiver side in gNB to maintain the original working coherence level. To compensate for when the phase drifting is too large, a gNB may claim that the UE is out of its declared coherence level. The gNB may then schedule the UE to operate at a lower coherence level to ensure suitable performance.

Figure 5:
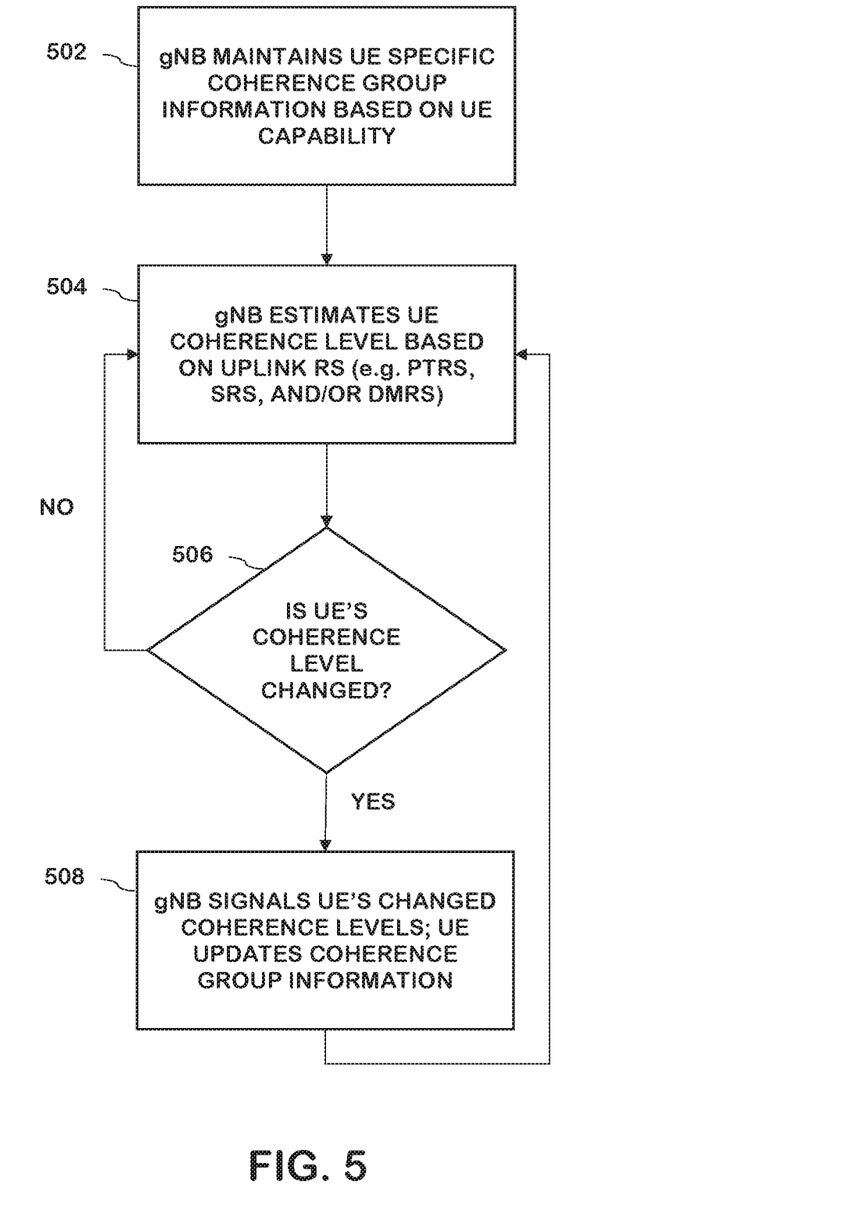
FIG. 5 is a flowchart of RAN node-based signaling in accordance with an example embodiment.

Referring now to FIG. 5, this figures shows a flowchart of gNB-based signaling of UE coherence group information in accordance with an example embodiment. At block 502, a gNB maintains UE specific coherence group information. Initially, such information is based on UE capability, and the gNB can configure the UE's coherence group information for scheduling purpose. At block 504, the gNB estimates UE's coherence level based on uplink RS (such as PTRS, SRS, and/or uplink DMRS, for example) when the UE is scheduled for uplink transmission. If there is a change in the coherence level on UE's Tx at 506, then the gNB signals UE's changed Tx coherence levels as shown at 508. The UE updates its coherence group information accordingly; and a gNB reschedules UE's UL-MIMO operation accordingly, following similar rescheduling examples. If the UEs coherence level does not change at 506, then the gNB continues to estimate the UE coherence level at block 504.

Figure 6:
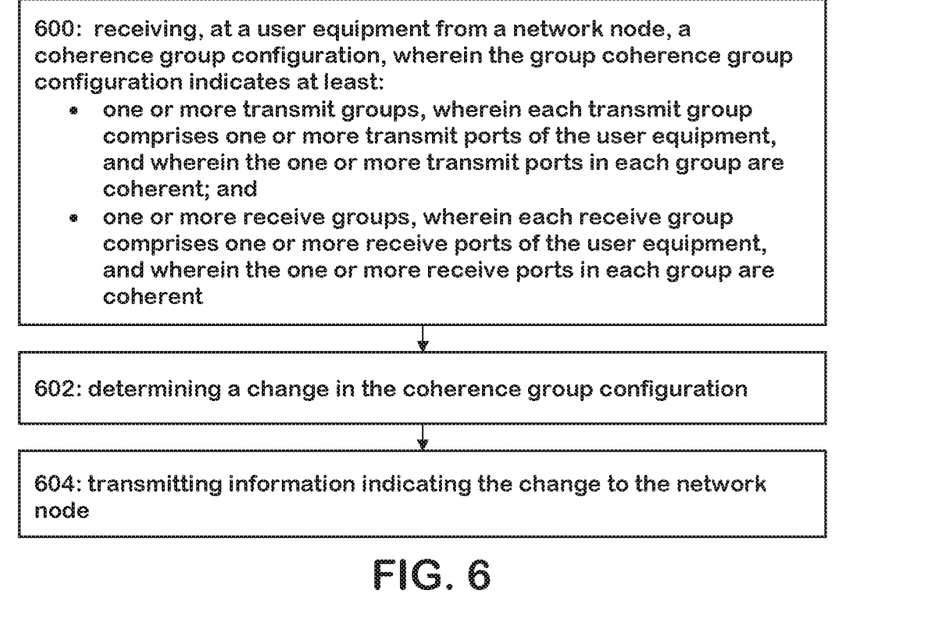
FIGS. 6 and 7 are logic flow diagrams for dynamic signaling of coherence levels, and illustrate the operation of exemplary methods, a result of execution of computer program instructions embodied on a computer readable memory, functions performed by logic implemented in hardware, and/or interconnected means for performing functions in accordance with exemplary embodiments.

FIG. 6 is a logic flow diagram for dynamic signaling of coherence levels. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the co-group module 140-1 and/or 140-2 may include multiples ones of the blocks in FIG. 6, where each included block is an interconnected means for performing the function in the block. The blocks in FIG. 6 are assumed to be performed by the UE 110, e.g., under control of the co-group module 140-1 and/or 140-2 at least in part.

According to an example of an embodiment (which may be referred to as example 1), a method is provided including: receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent as indicated by block 600; determining a change in the coherence group configuration as indicated by block 602; and transmitting information indicating the change to the network node as indicated by block 604.

An example of a further embodiment (which may be referred to as example 2), is a method as in example 1, wherein the coherence group configuration further indicates whether one or more group associations exist between the transmit groups and the receive groups.

An example of a further embodiment (which may be referred to as example 3), is a method as in any one of examples 1-2, wherein the change in the coherence group configuration comprises at least one of: a different number of transmit groups; a different number of receive groups; and different group associations between the transmit groups and the receive groups.

An example of a further embodiment (which may be referred to as example 4), is a method as in any one of examples 2-3, wherein a group association between a first transmit group and a first receive group exists when the one or more transmit ports of the first transmit group are coherent with the one or more receive ports of the first receive group.

An example of a further embodiment (which may be referred to as example 5), is a method as in any one of examples 1-4, wherein determining the change in the coherence group configuration comprises: determining that a port calibration process failed to maintain at least one of: a coherency between at least one first receive port and at least one second receive port in the same receive group; a coherency between at least one first transmit port and at least one second transmit port in the same transmit group; and a coherency between at least one transmit port of a first transmit group and at least one receive port from a first receive group when the coherence group information indicates a group association between the first transmit group and the first receive group.

An example of a further embodiment (which may be referred to as example 6), is a method as in any one of examples 1-5, wherein the one or more transmit groups of the received coherence group configuration comprises one of: a single transmit group comprising all of the transmit ports of the user equipment; and two or more transmit groups, where each of the two or more transmit groups comprises a different, subset of the transmit ports of the user equipment.

An example of a further embodiment (which may be referred to as example 7), is a method as in any one of examples 1-6, wherein the one or more receive groups of the received coherence group configuration comprises one of: a single receive group comprising all of the transmit ports of the user equipment; and two or more receive groups, where each of the two or more receive groups comprises a different, subset of the receive ports of the user equipment.

An example of a further embodiment (which may be referred to as example 8), is a method as in any one of examples 1-7, wherein the coherence group configuration is received in response to transmitting, to the network node, capability information indicating at least a number of the transmit ports and/or the receive ports of the user equipment.

An example of a further embodiment (which may be referred to as example 9), is a method as in any one of examples 1-8, the method further comprising, in response to transmitting the change in the coherence group configuration, receiving scheduling information from the network node for rescheduling multiple input multiple output uplink transmissions.

In an example embodiment, an apparatus is provided (which may be referred to as example 10) including: means for receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; means for determining a change in the coherence group configuration; and means for transmitting information indicating the change to the network node.

An example of a further embodiment (which may be referred to as example 11), is an apparatus as in example 10), further comprising means for performing a method as in any one of examples 2-9.

An example of a further embodiment (which may be referred to as example 12), is a computer readable medium comprising program instructions for causing an apparatus to perform at least the following: receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; determining a change in the coherence group configuration; and transmitting information indicating the change to the network node.

An example of a further embodiment (which may be referred to as example 13), is a computer readable medium as in example 12, wherein the program instructions further cause the apparatus to perform a method as in any one of examples 2-9.

In an example embodiment (which may be referred to as example 14), an apparatus is provided comprising: at least one processor; and at least one non-transitory memory including computer program code, the at least one memory and the computer program code configured to, with the at least one processor, cause the apparatus to perform at least: receiving, at a user equipment from a network node, a coherence group configuration, wherein the group coherence group configuration indicates at least: one or more transmit groups, wherein each transmit group comprises one or more transmit ports of the user equipment, and wherein the one or more transmit ports in each group are coherent; and one or more receive groups, wherein each receive group comprises one or more receive ports of the user equipment, and wherein the one or more receive ports in each group are coherent; determining a change in the coherence group configuration; and transmitting information indicating the change to the network node.

An example of a further embodiment (which may be referred to as example 15), is an apparatus as in example 14, wherein the apparatus is further caused to perform a method as in any one of examples 2-9.

Figure 7:
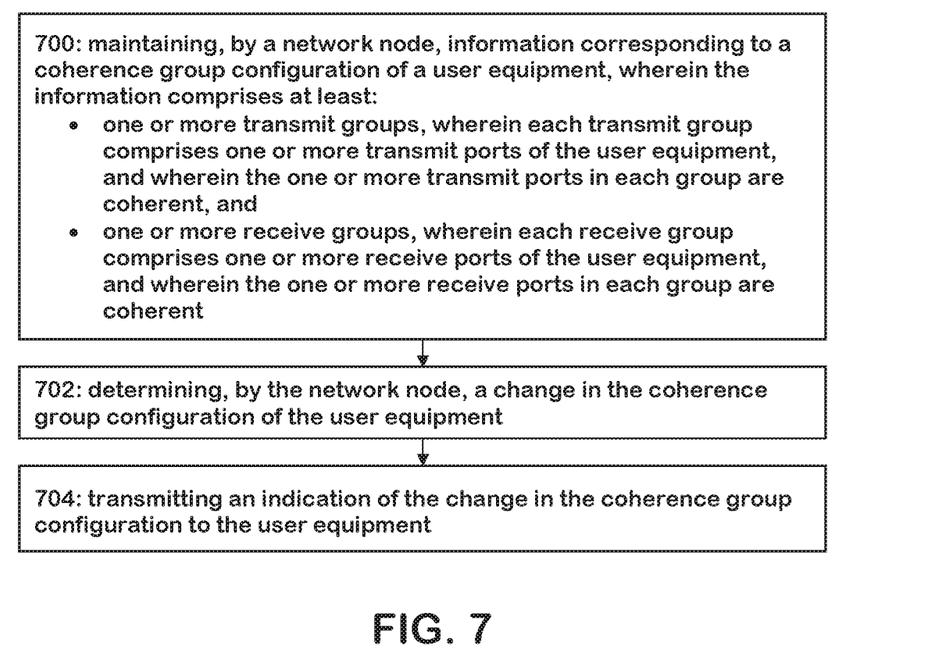

FIG. 7 is a logic flow diagram for dynamic signaling of coherence levels. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the configuration module 150-1 and/or 150-2 may include multiples ones of the blocks in FIG. 7, where each included block is an interconnected means for performing the function in the block. The blocks in FIG. 7 are assumed to be performed by a base station such as RAN node 170, e.g., under control of the configuration module 150-1 and/or 150-2 at least in part.

According to an example of an embodiment (which may be referred to as example 16), a method is provided including: maintaining, by a network node, information corresponding to a coherence group configuration of a user equipment, wherein the information comprises at least: one or more transmit groups, wherein each transmit group comprises one or more transmit ports of the user equipment, and wherein the one or more transmit ports in each group are coherent, and one or more receive groups, wherein each receive group comprises one or more receive ports of the user equipment, and wherein the one or more receive ports in each group are coherent as indicated by block 700; determining, by the network node, a change in the coherence group configuration of the user equipment as indicated by block 702; and transmitting an indication of the change in the coherence group configuration to the user equipment as indicated by block 704.

An example of a further embodiment (which may be referred to as example 17), is a method as in example 16, wherein the information corresponding to a coherence group configuration further comprises: whether one or more group associations exist between the transmit groups and the receive groups.

An example of a further embodiment (which may be referred to as example 18), is a method as in any one of examples 16-17, wherein the change in the coherence group configuration comprises at least one of: a different number of transmit groups; a different number of receive groups; and different group associations between the transmit groups and the receive groups.

An example of a further embodiment (which may be referred to as example 19), is a method as in any one of examples 16-18, wherein the determining of the change in the coherence group configuration comprises at least one of: determining the change based on at least one uplink reference signal received from the user equipment; and receiving, from the user equipment, an explicit indication indicating at least some of the information corresponding to the coherence group configuration is changed.

An example of a further embodiment (which may be referred to as example 20), is a method as in example 19, wherein the at least one uplink reference signal comprise at least one of: a phase-tracking reference signal, a sounding reference signal; and a demodulation reference signal;

An example of a further embodiment (which may be referred to as example 21), is a method as in any one of examples 19-20, wherein the determining of the change comprises at least: determining, based on the least one uplink reference signal that a first transmit port and a second transmit port in the same transmit group are no longer coherent.

An example of a further embodiment (which may be referred to as example 22), is a method as in any one of examples 16-21, the method further comprising updating the information based at least on the change and a coherence capability of the user equipment.

An example of a further embodiment (which may be referred to as example 23), is a method as in any one of examples 16-22, the method further comprising: transmitting scheduling information to the user equipment for rescheduling one or more multiple input multiple output uplink transmissions based on the change in the coherence group configuration.

In an example embodiment, an apparatus is provided (which may be referred to as example 24) including: means for maintaining, by a network node, information corresponding to a coherence group configuration of a user equipment, wherein the information comprises at least: one or more transmit groups, wherein each transmit group comprises one or more transmit ports of the user equipment, and wherein the one or more transmit ports in each group are coherent, and one or more receive groups, wherein each receive group comprises one or more receive ports of the user equipment, and wherein the one or more receive ports in each group are coherent; means for determining, by the network node, a change in the coherence group configuration of the user equipment; and means for transmitting an indication of the change in the coherence group configuration to the user equipment.

An example of a further embodiment (which may be referred to as example 25), is an apparatus as in example 24), further comprising means for performing a method as in any one of examples 17-23.

An example of a further embodiment (which may be referred to as example 26), is a computer readable medium comprising program instructions for causing an apparatus to perform at least the following: maintaining, by a network node, information corresponding to a coherence group configuration of a user equipment, wherein the information comprises at least: one or more transmit groups, wherein each transmit group comprises one or more transmit ports of the user equipment, and wherein the one or more transmit ports in each group are coherent, and one or more receive groups, wherein each receive group comprises one or more receive ports of the user equipment, and wherein the one or more receive ports in each group are coherent; determining, by the network node, a change in the coherence group configuration of the user equipment; and transmitting an indication of the change in the coherence group configuration to the user equipment.

An example of a further embodiment (which may be referred to as example 27), is a computer readable medium as in example 26, wherein the program instructions further cause the apparatus to perform a method as in any one of examples 17-23.

In an example embodiment (which may be referred to as example 28), an apparatus is provided comprising: at least one processor; and at least one non-transitory memory including computer program code, the at least one memory and the computer program code configured to, with the at least one processor, cause the apparatus to perform at least: maintaining, by a network node, information corresponding to a coherence group configuration of a user equipment, wherein the information comprises at least: one or more transmit groups, wherein each transmit group comprises one or more transmit ports of the user equipment, and wherein the one or more transmit ports in each group are coherent, and one or more receive groups, wherein each receive group comprises one or more receive ports of the user equipment, and wherein the one or more receive ports in each group are coherent; determining, by the network node, a change in the coherence group configuration of the user equipment; and transmitting an indication of the change in the coherence group configuration to the user equipment.

An example of a further embodiment (which may be referred to as example 29), is an apparatus as in example 28, wherein the apparatus is further caused to perform a method as in any one of examples 17-23.

Without in any way limiting the scope, interpretation, or application of the claims appearing below, a technical effect of one or more of the example embodiments disclosed herein is providing a framework for efficiently managing Tx/Rx coherence status. Another technical effect of one or more of the example embodiments disclosed herein is to enable optimal uplink MIMO performance for a UE under the UE's various coherence levels. Another technical effect of one or more of the example embodiments disclosed herein is enabling a gNB to actively control a UE's operation under various coherence levels to achieve optimal network performance. Another technical effect of one or more of the example embodiments disclosed herein is actively supporting reciprocity-based downlink/uplink transmission schemes for TDD systems.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
    receiving, at a user equipment from a network node, a coherence group configuration,
    wherein the coherence group configuration indicates at least:
        one or more transmit groups, wherein each transmit group of the one or more transmit groups comprises one or more transmit ports of the user equipment, and wherein the one or more transmit ports in each transmit group of the one or more transmit groups are phase-calibrated; and
        one or more receive groups, wherein each receive group comprises one or more receive ports of the user equipment, and wherein the one or more receive ports in each group are phase-calibrated;
    determining a change in the coherence group configuration; and
    transmitting information indicating the change to the network node.

2. The method as in claim 1, wherein the coherence group configuration further indicates:
    whether one or more group associations exist between the one or more transmit groups and the one or more receive groups.

3. The method as in claim 2, wherein a group association between a first transmit group and a first receive group exists when the one or more transmit ports of the first transmit group are phase-calibrated with the one or more receive ports of the first receive group.

4. The method as in claim 1, wherein the change in the coherence group configuration comprises at least one of:
    a different number of transmit groups of the one or more transmit groups;
    a different number of receive groups of the one or more receive groups; and
    different group associations between the transmit groups and the receive groups.

5. The method as in claim 1, wherein determining the change in the coherence group configuration comprises:
    determining that a port calibration process failed to maintain at least one of:
        a coherency between at least one first receive port and at least one second receive port in a same receive group;
        a coherency between at least one first transmit port and at least one second transmit port in the same transmit group; and
        a coherency between at least one transmit port of a first transmit group and at least one receive port from a first receive group when the coherence group information indicates a group association between the first transmit group and the first receive group.

6. The method as in claim 1, wherein the one or more transmit groups of the received coherence group configuration comprises one of:
    a single transmit group comprising all of the transmit ports of the user equipment; and
    two or more transmit groups, where each of the two or more transmit groups comprises a different, subset of the transmit ports of the user equipment.

7. The method as in claim 1, wherein the one or more receive groups of the received coherence group configuration comprises one of:
    a single receive group comprising all of the transmit ports of the user equipment; and
    two or more receive groups, where each of the two or more receive groups comprises a different, subset of the receive ports of the user equipment.

8. The method as in claim 1, wherein the coherence group configuration is received in response to transmitting, to the network node, capability information indicating at least a number of the transmit ports and/or the receive ports of the user equipment.

9. The method as in claim 1, further comprising,
    in response to transmitting the change in the coherence group configuration, receiving scheduling information from the network node for rescheduling multiple input multiple output uplink transmissions.

10. An apparatus comprising:
    at least one processor; and
    at least one non-transitory memory including computer program code, the at least one memory and the computer program code configured to, with the at least one processor, cause the apparatus to perform at least:
        receiving, at a user equipment from a network node, a coherence group configuration,
        wherein the coherence group configuration indicates at least:

one or more transmit groups, wherein each transmit group of the one or more transmit groups comprises one or more transmit ports of the user equipment, and wherein the one or more transmit ports in each transmit group of the one or more transmit groups are phase-calibrated; and one or more receive groups, wherein each receive group comprises one or more receive ports of the user equipment, and wherein the one or more receive ports in each group are phase-calibrated;

determining a change in the coherence group configuration; and transmitting information indicating the change to the network node.

11. The apparatus as in claim 10, wherein the coherence group configuration further indicates:

whether one or more group associations exist between the one or more transmit groups and the one or more receive groups.

12. The apparatus as in claim 10, wherein the change in the coherence group configuration comprises at least one of:

a different number of transmit groups of the one or more transmit groups;

a different number of receive groups of the one or more receive groups; and different group associations between the transmit groups and the receive groups.

13. The apparatus as in claim 10, wherein a group association between a first transmit group and a first receive group exists when the one or more transmit ports of the first transmit group are phase-calibrated with the one or more receive ports of the first receive group.

14. The apparatus as in claim 10, wherein determining the change in the coherence group configuration comprises:

determining that a port calibration process failed to maintain at least one of:

a coherency between at least one first receive port and at least one second receive port in a same receive group;

a coherency between at least one first transmit port and at least one second transmit port in the same transmit group; and a coherency between at least one transmit port of a first transmit group and at least one receive port from a first receive group when the coherence group information indicates a group association between the first transmit group and the first receive group.

15. The apparatus as in claim 10, wherein the one or more transmit groups of the received coherence group configuration comprises one of:

a single transmit group comprising all of the transmit ports of the user equipment; and two or more transmit groups, where each of the two or more transmit groups comprises a different, subset of the transmit ports of the user equipment.

16. The apparatus as in claim 10, wherein the one or more receive groups of the received coherence group configuration comprises one of:

a single receive group comprising all of the transmit ports of the user equipment; and two or more receive groups, where each of the two or more receive groups comprises a different, subset of the receive ports of the user equipment.

17. The apparatus as in claim 10, wherein the coherence group configuration is received in response to transmitting, to the network node, capability information indicating at least a number of the transmit ports and/or the receive ports of the user equipment.

18. The apparatus as in claim 10, further comprising, in response to transmitting the change in the coherence group configuration, receiving scheduling information from the network node for rescheduling multiple input multiple output uplink transmissions.

19. A non-transitory computer readable medium comprising program instructions for causing an apparatus to perform at least the following:

receiving, at a user equipment from a network node, a coherence group configuration, wherein the coherence group configuration indicates at least:

one or more transmit groups, wherein each transmit group of the one or more transmit groups comprises one or more transmit ports of the user equipment, and wherein the one or more transmit ports in each transmit group of the one or more transmit groups are phase-calibrated; and one or more receive groups, wherein each receive group comprises one or more receive ports of the user equipment, and wherein the one or more receive ports in each group are phase-calibrated;

determining a change in the coherence group configuration; and transmitting information indicating the change to the network node.

20. The non-transitory computer readable medium as in claim 19, wherein the coherence group configuration further indicates:

whether one or more group associations exist between the one or more transmit groups and the one or more receive groups.

* * * * *